Figure 6:
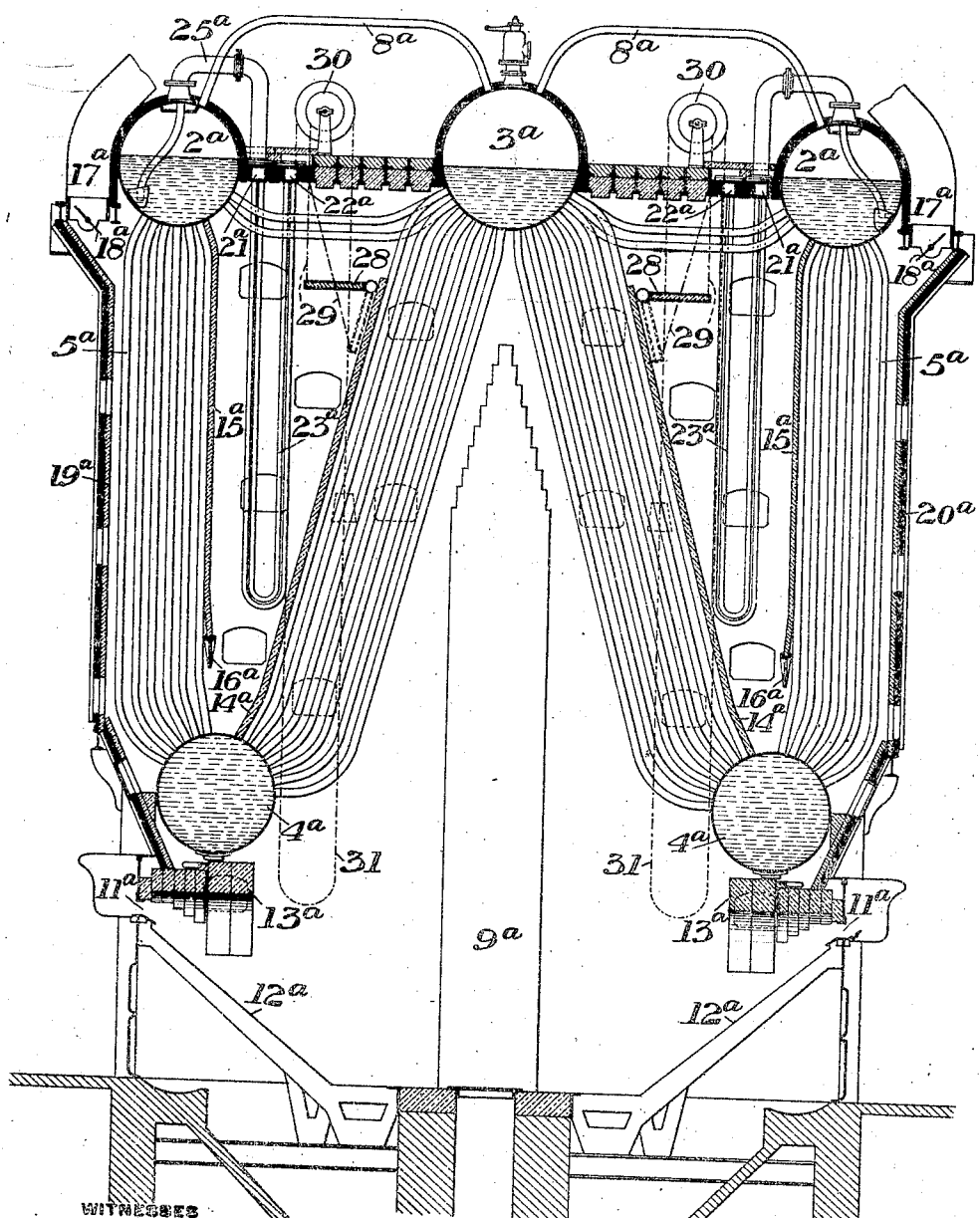

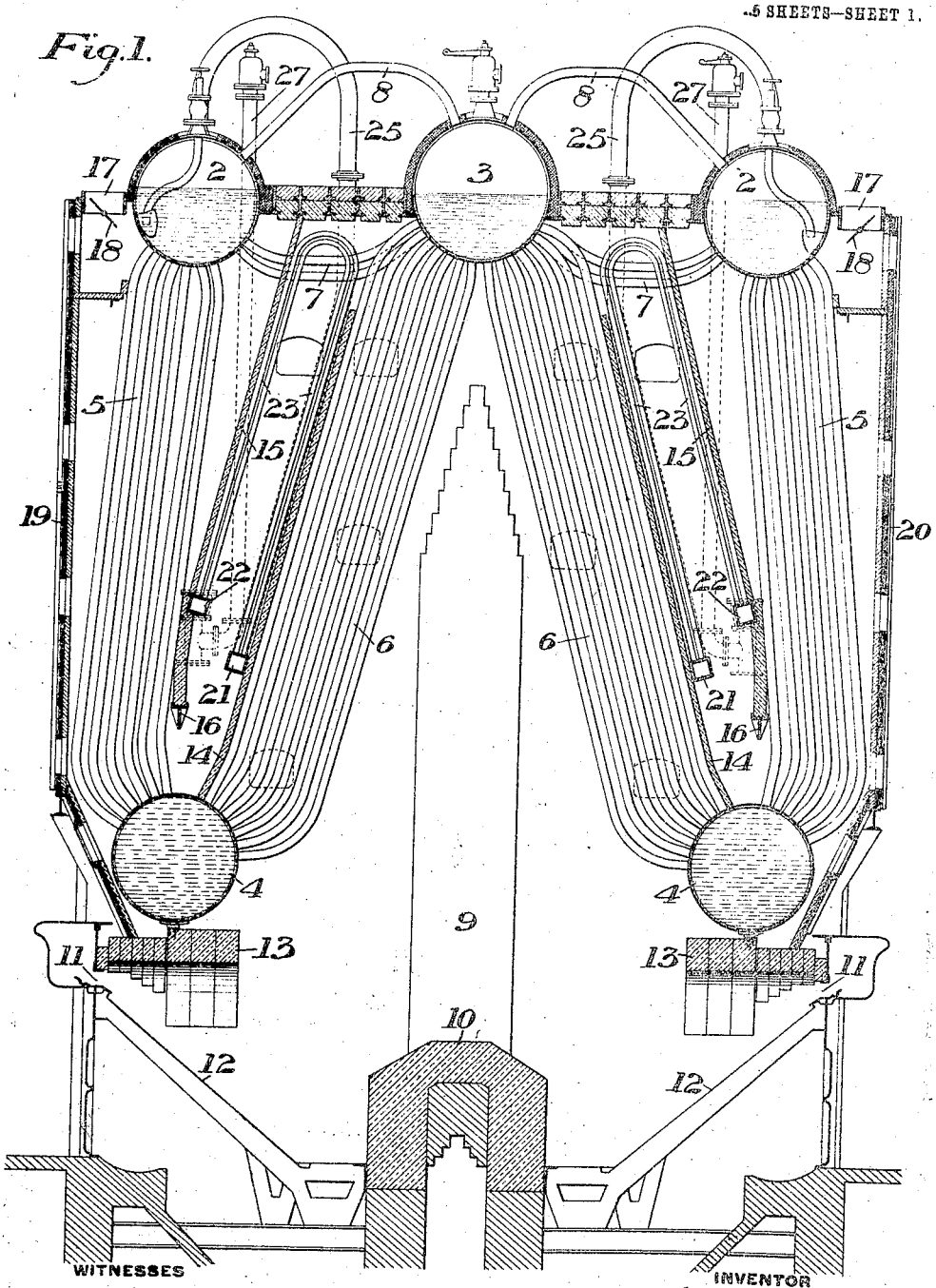

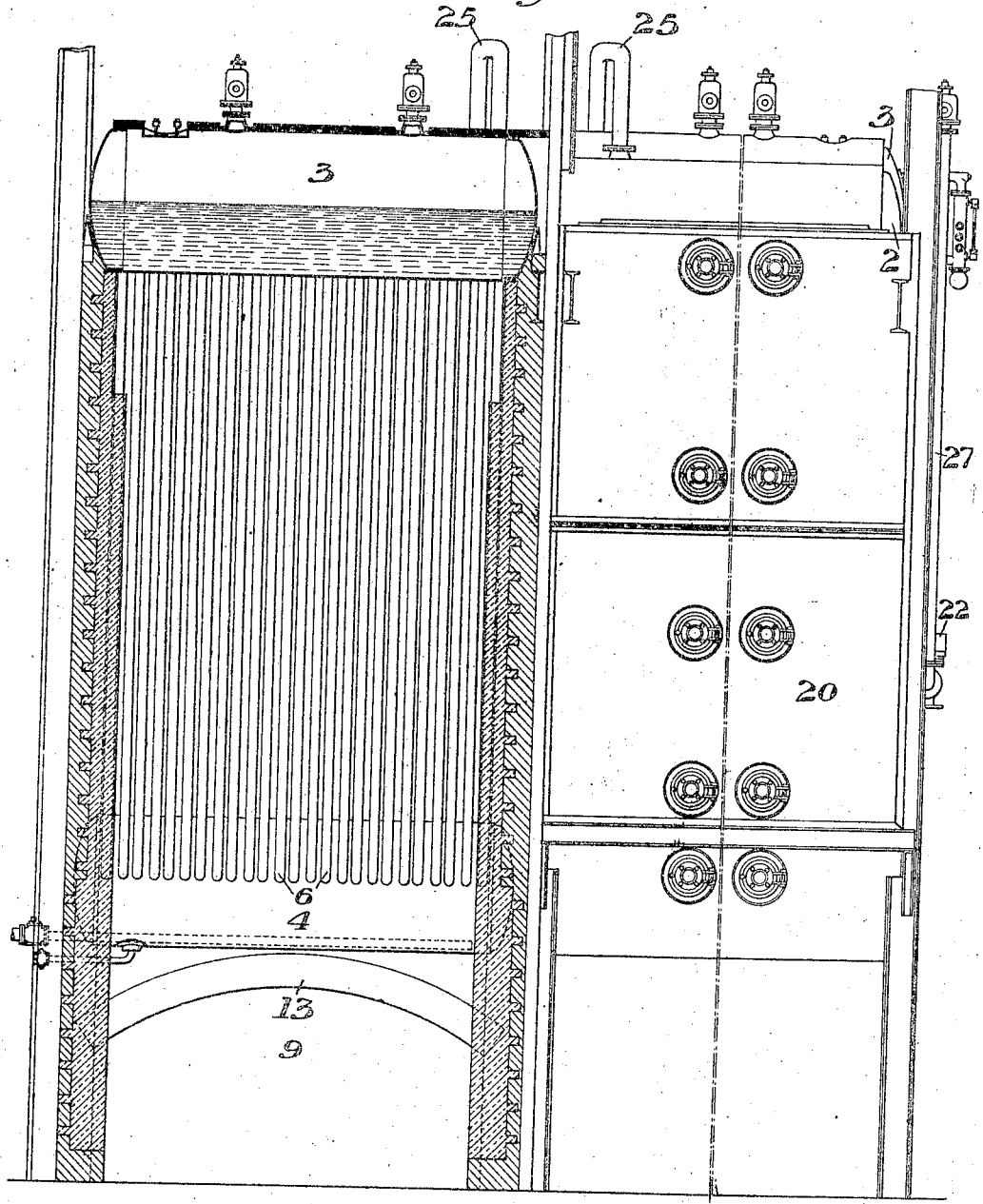

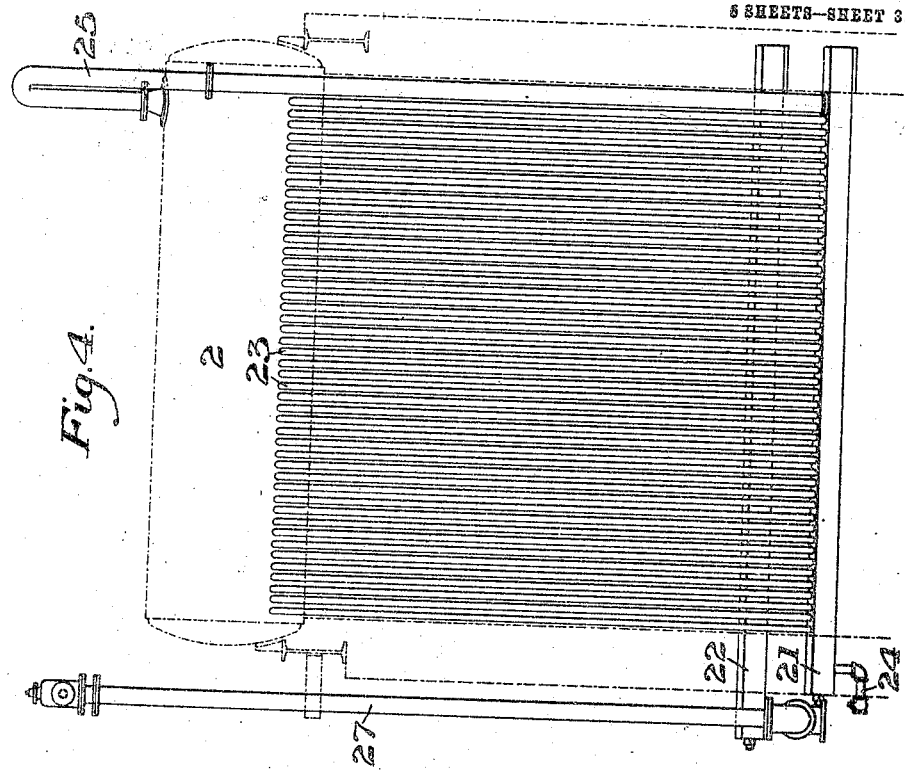
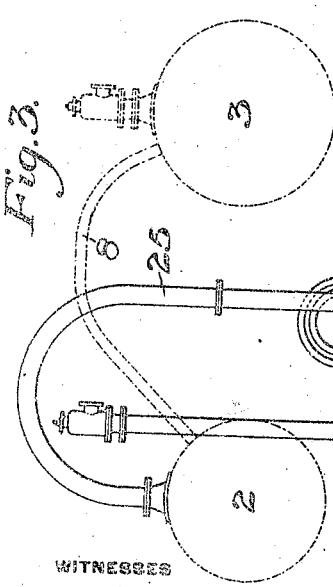
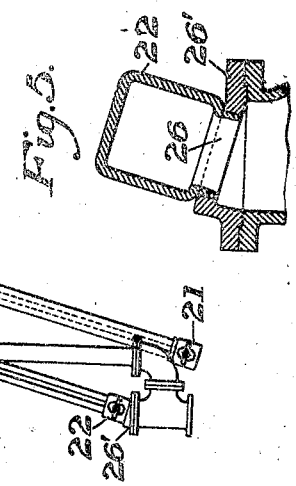

J. P. SNEDDON.
WATER TUBE BOILER.
APPLICATION FILED MAR. 6, 1907.

942,797.

Patented Dec. 7, 1909.
5 SHEETS—SHEET 4.

WITNESSES
W. W. Swartz
R. A. Balderson

INVENTOR
James P. Sneddon
by Bakewell & Byrnes
his attys

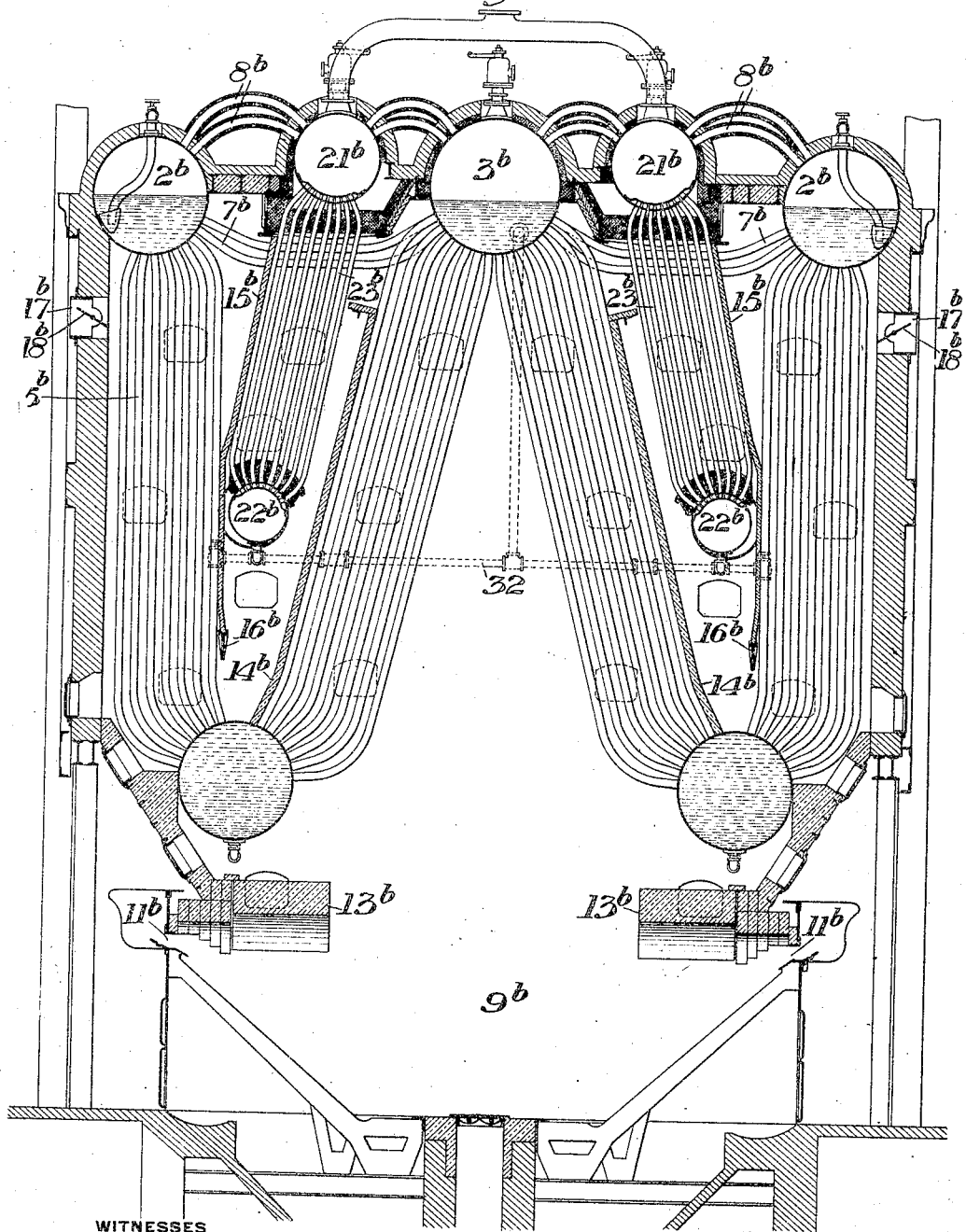

UNITED STATES PATENT OFFICE.

JAMES P. SNEDDON, OF BARBERTON, OHIO, ASSIGNOR TO THE BABCOCK & WILCOX COMPANY, OF NEW YORK, N. Y., A CORPORATION OF NEW JERSEY.

WATER-TUBE BOILER.

942,797.  Specification of Letters Patent.  Patented Dec. 7, 1909.

Application filed March 6, 1907. Serial No. 360,849.

*To all whom it may concern:*

Be it known that I, JAMES P. SNEDDON, of Barberton, Summit county, Ohio, have invented a new and useful Water-Tube Boiler, of which the following is a full, clear, and exact description, reference being had to the accompanying drawings, forming part of this specification, in which—

Figure 1 is a sectional side elevation showing one form of my improved boiler; Fig. 2 is a front elevation of the same, one half in section; Figs. 3, 4, and 5 are detail views of the superheater connection; and Figs. 6 and 7 are views similar to Fig. 1 showing modified forms of the invention.

My invention relates to water tube boilers, and is designed to provide a new and improved boiler for installations of large power.

The object is to economize in floor space, cost of buildings, steam piping, etc.

A further object is to provide an improved construction and arrangement of superheater in connection with the boiler.

In the drawings, referring to the form of Figs. 1, 2 and 3, I show a five-drum boiler having two outer upper drums 2, 2 and an intermediate and preferably larger drum 3.

4, 4 are the lower mud drums; all of these drums being preferably parallel and extending transversely of the setting. The drums 2 and 4 are connected by banks of tubes 5, while the drum 3 is connected with the mud drums 4 by the banks of tubes 6. Each of the drums 2 is connected with the middle drum 3 by water circulators 7, and also by the upper steam circulators 8. The furnace chamber 9 preferably extends beneath the entire boiler, and is preferably provided with a central bridge wall 10. In the form shown, the boiler is fired at both ends through firing doors 11, 11, the grates 12 being shown as inclined downwardly toward the central bridge wall. Each mud drum is preferably protected by an arch or roof 13 of fire brick or refractory material, and the gases rising between the banks of tubes 6 divide at the upper part of the chamber, and flow in opposite directions through up and down passes and over suitable baffling. In the form shown, each divided half of the gases is given three passes by means of baffles 14 lying on the banks of tubes 6, and the baffles 15 spaced apart therefrom and having their lower ends supported on the cross bearers 16.

17, 17 are the outlet flues leading to the stack and controlled by dampers 18. The front and back walls 19 and 20 of the boiler setting are both firing fronts, as the boiler is fired from both ends.

In the form shown, the intermediate or downward passes of the gases between the baffles 14 and 15 are provided with superheaters which thus receive heat from the gases after they pass over the tubes 6 and before passing upwardly among the tubes 5 to the outlet flues.

Any suitable type of superheater may be used, and in my claims upon the boiler proper, I do not wish to be restricted to the use of any superheater at all. In the form shown, the superheater consists of two transverse junction boxes or continuous headers 21 and 22 which are connected by the upwardly-extending U-shaped tubes 23. The object in inverting this U-type of superheater is to provide drainage for the junction boxes or headers.

As shown in Figs. 3 and 4, the ends of the headers are embedded in one side wall and extend through the other side wall. These headers are also preferably slightly inclined endwise so that they will drain toward one end. A drainage pipe and cock are provided as shown at 24. The lower box or header of each superheater is connected to the steam space of its corresponding drum 2 by a pipe 25 leading upwardly from the drum and thence downwardly within the setting to one end portion of the lower header. The other header is extended beyond the side wall, and both headers are provided with hand hole openings at these ends. In order to allow this hand hole opening on the outlet header, I form the projecting end portion of the header with a side projecting nozzle flange 26 having a cap 26' shrunk thereon, and to which the flange of the outlet pipe 27 is bolted.

In the operation of this superheater boiler, the fuel is fed in both front and back upon the pairs of grates. The flame and gases rising into the central part of the A-shaped combustion chamber divide at the top of this chamber, and flow in opposite directions downwardly among the tubes of the superheaters. They then flow up among the banks of tubes 5 to the outlet flues. The circulation is up through the tubes 6, and thence down through the tubes 5, being a double Stirling circulation. The steam entering drum 3 is led over to the drums 2, and the steam from the drums 2 passes through the valve pipes to the superheater, where it is superheated and taken off through the box outlets.

In Fig. 6 I show a form similar to that of Figs. 1 to 5, inclusive, except that the superheaters are inverted and their boxes placed in the roof of the setting. In this case also the baffles 15ª are arranged close to the outer sets of water tubes so as to leave a triangular space between the two baffles for the superheater. I also prefer to employ in this case a pair of hinged baffles 28, which are pivoted at the upper ends of the baffles 14ª and are connected by chains 29 leading up through holes in the top of the setting to drums 30 on shafts actuated by depending chains 31 extending down within the reach of the operator. In this form parts similar to those of Fig. 1 are indicated by similar numerals with the letter $a$ applied.

In Fig. 7 I show a form similar to that of Fig. 1, except that instead of U-shaped superheaters the drum type is employed, the boxes being replaced by drums 21ᵇ and 22ᵇ. In this case the upper drum is provided with a transverse partition midway of its length, and the inlet tubes 8ᵇ lead into one side of the partition from the drums 2ᵇ and 3ᵇ. This gives an up and down pass in the bank of the superheating tubes, the steam outlet being in the chamber on the other side of the partition. In this drawing, parts similar to those of Fig. 1 are indicated by similar numerals with the letter $b$ applied. In this form I show a flooding system, comprising a pipe system 32 leading from the water space of the steam and water drum 3ᵇ into the lower drums of the superheaters.

The boiler shown is of an improved type, especially adapted for large units, since it economizes floor space, and gives a very large grate area for the space occupied. The mud drums are protected from the furnace heat by the arches, and the boiler is economical and efficient. The superheater is of an improved type, and gives especially good results in the location and arrangement shown.

The number of upper drums may be varied as well as the number of mud drums; the boiler may be used with or without superheaters; the baffling may be changed; the connections and circulation may be varied; the tubes may be straight or curved at their ends; and many other changes may be made without departing from the spirit and scope of my invention.

I claim:

1. A water tube boiler of the A-shaped type having a centrally-disposed primary combustion chamber, firing openings at both front and rear of the boiler setting, drums, and circulating tubes connecting the drums, substantially as described.

2. A water tube boiler of the class described having a central primary combustion chamber and provided with firing openings at both front and rear of the boiler setting, a plurality of escape flues, and baffles for dividing the products of combustion from the central combustion chamber and directing the divided currents independently toward said escape flues, substantially as described.

3. In a water tube boiler of the class described, a centrally-disposed primary combustion chamber, firing openings arranged at both front and rear of the boiler setting, a pair of escape flues, and means for dividing the products of combustion from the central combustion chamber and causing the same to flow in independent paths toward the escape flues, substantially as described.

4. In a water tube boiler of the class described, a centrally-disposed primary combustion chamber, firing openings arranged at both front and rear of the boiler setting, a pair of escape flues, drums, circulating tubes connecting the drums, and baffles arranged between the banks of tubes, said baffles serving to direct separate portions of the products of combustion from the central combustion chamber in independent streams toward the escape flues, substantially as described.

5. A water tube boiler of the A-shaped type having firing openings at both front and rear, a central primary combustion chamber with which both firing openings communicate, a pair of lower mud drums, a plurality of upper steam and water drums, banks of tubes connecting the drums, and baffles arranged between the banks of tubes, substantially as described.

6. In a water tube boiler of the A-shaped type, front and rear firing openings, a centrally-disposed combustion chamber with which both firing openings communicate, escape flues for the products of combustion, drums, a plurality of banks of tubes connecting said drums, baffles disposed between the banks of tubes and forming superheater chambers, and superheaters arranged in such chambers and disposed in the direct course of the products of combustion, substantially as described.

7. A water tube boiler having front and rear firing openings and a central primary combustion chamber, a pair of escape flues for the products of combustion, a pair of mud drums, a central and a pair of outer steam and water drums, banks of tubes connecting the outer steam and water drums to the mud drums, inclined banks of tubes connecting the central steam and water drum to both mud drums, a pair of baffles arranged in the space between each inclined bank of tubes and each outermost bank of tubes, and a superheater disposed between each pair of baffles, substantially as described.

8. In a water tube boiler of the class described, firing openings arranged at both front and rear of the boiler setting, a centrally-disposed combustion chamber, a pair of outlet flues disposed at the upper portion of the setting, a plurality of drums and circulating tubes, and baffles for directing the course of the products of combustion in two independent paths from the central combustion chamber to the outlet flues, substantially as described.

9. In an A-shaped water tube boiler having a central combustion chamber, a pair of separate escape flues, drums, and front and rear sets of circulating tubes connecting the drums, the innermost banks of tubes extending on inclined lines within the upper portion of the central combustion chamber, baffles for directing the divided currents of products of combustion from the central combustion chamber toward the escape flues, and superheaters arranged between said baffles, substantially as described.

10. An A-shaped water tube boiler including a centrally-disposed primary combustion chamber, front and rear firing openings both communicating with the combustion chamber, front and rear transverse mud drums, a steam and water drum arranged at the upper portion of the combustion chamber and in a vertical plane approximately midway the interval between the mud drums, and inclined banks of tubes connecting the mud drums to said steam and water drum, substantially as described.

11. A water tube boiler including a centrally-disposed primary combustion chamber, front and rear firing openings, front and rear transverse mud drums, a steam and water drum located above and in a vertical plane approximately midway the interval between the two mud drums, front and rear steam and water drums, inclined banks of tubes connecting the middle steam and water drums with the mud drums, and outer banks of tubes connecting the mud drums with the respective front and rear steam and water drums, substantially as described.

In testimony whereof, I have hereunto set my hand.

JAMES P. SNEDDON.

Witnesses:
  A. H. KIRKEAND,
  J. C. FRANK.